United States Patent [19]
Saxl

[11] 3,865,418
[45] Feb. 11, 1975

[54] SAFETY DEVICES

[75] Inventor: Karel Saxl, Sutton Coldfield, England

[73] Assignee: Imperial Metal Industries (Kynoch) Ltd., Birmingham, Warwickshire, England

[22] Filed: July 3, 1973

[21] Appl. No.: 376,203

[52] U.S. Cl. .................. 293/89, 188/1 C, 293/1
[51] Int. Cl. ............................................. B60r 19/02
[58] Field of Search ............ 188/1 C; 293/1, 70, 89, 293/DIG. 3, 11, 88; 267/139

[56] References Cited
UNITED STATES PATENTS

| | | | |
|---|---|---|---|
| 3,097,725 | 7/1963 | Peterson | 188/1 C X |
| 3,209,864 | 10/1965 | Boyd | 188/1 C |
| 3,380,557 | 4/1968 | Peterson | 188/1 C |
| 3,398,812 | 8/1968 | Peterson | 188/1 C |
| 3,721,320 | 3/1973 | Hirsch | 188/1 C |

Primary Examiner—M. Henson Wood, Jr.
Assistant Examiner—Andres Kashnikow
Attorney, Agent, or Firm—Cushman, Darby & Cushman

[57] ABSTRACT

An energy absorbing device for a vehicle, the device including an extrudable slug and ram, and a vehicle including such a device, so arranged that movement of the vehicle bumper towards the vehicle results in extrusion of the slug.

11 Claims, 9 Drawing Figures

SAFETY DEVICES

BACKGROUND OF THE INVENTION

This invention relates to safety devices and has particular, but not exclusive, reference to safety devices in which energy is dissipated by extrusion.

Motor vehicles have, when in motion, a considerable amount of energy which has to be dissipated in the event of an accident. Proposals have been made to have bumpers resiliently mounted on springs to cope with minor accidents during parking. However, a disadvantage with such an arrangement is that the energy is only stored, rather than dissipated, and hence the vehicles tend to "bounce off" the object contacted.

SUMMARY OF THE INVENTION

By the present invention there is provided a vehicle including a bumper and a device including an extrudable slug, the device being so arranged that movement of the bumper relatively towards the vehicle results in extrusion of the slug.

The device may be positioned directly between the bumper and the vehicle and the device may include a container for the slug and a ram for extruding the slug.

The container may be secured to the vehicle; the slug may be an annular slug in the container and the ram may have a portion through the central passageway of the slug with an enlarged portion contactable with the slug.

The ram may have a plurality of external cross-sectional areas along its length; it may also have a plurality of external maximum diameters. The container may be deformable under load and may be secured to the vehicle, the slug then being located in the container and the ram then being located in the slug.

The container may be plastically deformable at a load greater than the load at which the slug is extruded, the container may be plastically deformable by rupturing and/or stretching.

The ram may have a first portion of a first diameter inside the slug, a second portion of a second greater diameter conjoined to the first portion, and a head conjoined to the second portion. Alternatively there may be a third portion between the second portion and the head, the third portion having a third diameter greater than the second diameter, the third portion being conjoined to the second portion and the head being conjoined to the third portion. The external diameter of the slug may be greater than the external diameter of the third portion and smaller than the external diameter of the head. The slug may be formed of a plastics material or a deformable metal.

The head may have a tapered portion which may be a frusto-conical portion with the end smaller diameter conjoined to the second or the third portion. The tapered portion may include at least one protruding breaker edge portion. The head may incorporate a low friction surface such as polytetrafluoroethylene, the low friction surface may be perpendicular to the axis of the ram and may be between two members in the head.

The slug may have a uniform resistance of deformation along its axial length, or the resistance to deformation may be variable along its axial length. In the case in which the resistance to deformation is variable, it may be continuously variable or discontinuously variable.

The bumper may be attached to the vehicle by the device or may be attached to the vehicle independently of the device, preferably by resilient means.

The ram may incorporate longitudinal slots, the slots may be of variable cross-section along their length and/or of variable length. The container may include stress raisers such as slots. The vehicle may include a plurality of devices.

BRIEF DESCRIPTION OF THE DRAWINGS

By way of example, embodiments of the present invention will now be described, with reference to the accompanying drawings, of which.

DESCRIPTION OF THE PREFERRED EMBODIMENTS

Figure 1:
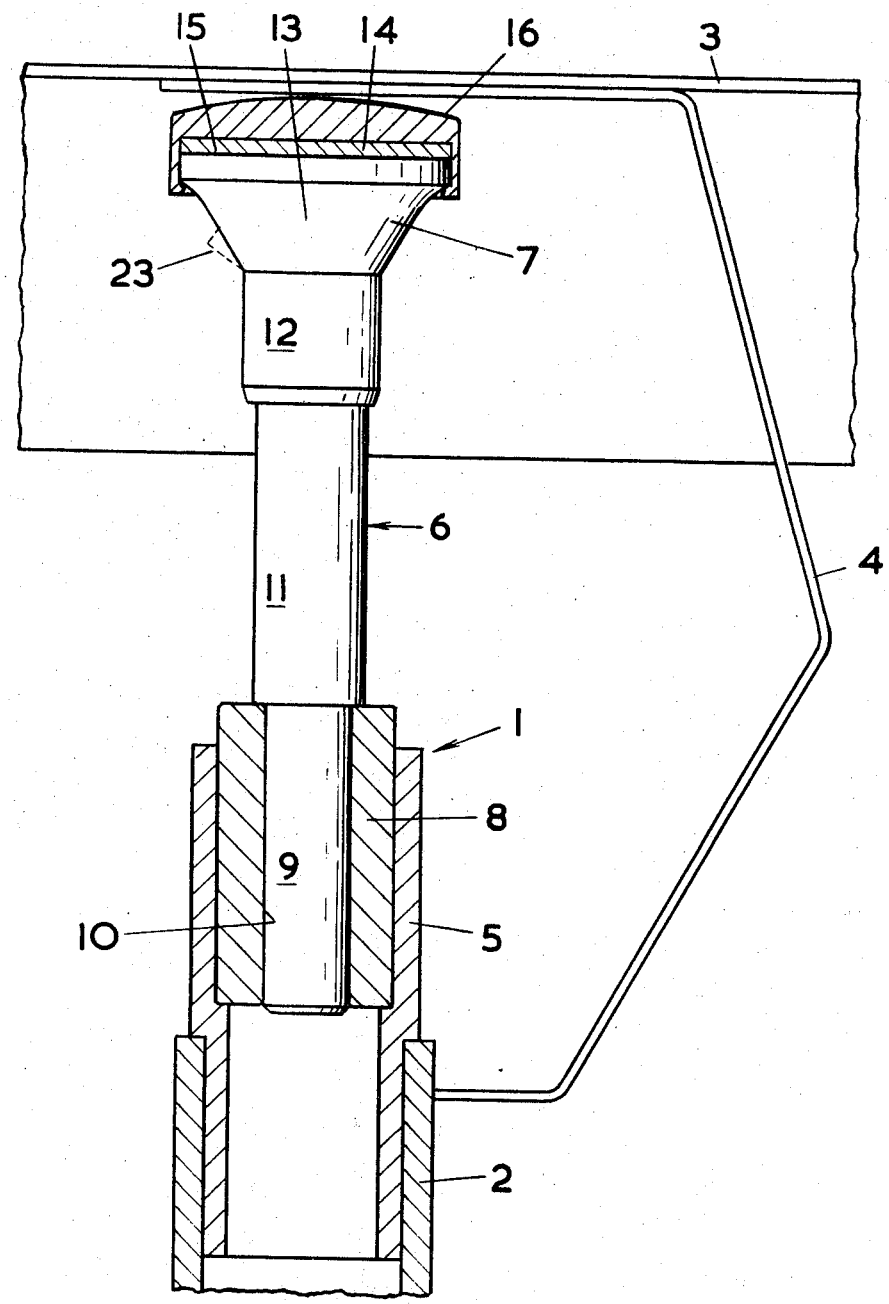
FIG. 1 is a cross-sectional view of a device.

Considering FIG. 1, the energy absorbing device indicated generally by 1 is located between a horn extension 2 which forms a part of a vehicle and a bumper 3 which is attached to the horn extension 2 by means of a spring 4. The device is formed from four basic components, a container 5, a ram 6, a head 7 and an extrudable slug 8.

The ram 6 has a first portion 9 of the smallest diameter which fits tightly inside a central annular passage 10 of the annular slug 8. A second portion 11 of the ram which is integral with the portion 9, abuts the slug 8 in the rest position. A third portion 12 is joined to the end of the second portion 11 and the head 7 is integral with the third portion 12. The head 7 has a frusto-conical portion 13 and a plate-like member 14 separated from the frusto-conical portion 13 by means of a low friction polytetrafluoroethylene layer 15. A rubber cap 16 surrounds the end of the head to keep it water/and dust-tight.

The sequence of operation of the device is most easily seen with reference to FIGS. 2 to 5 which show the device in action. If it is assumed that the device receives a head-on blow, initially the portion 11 will extrude an annular ring of the slug 8 into the gap between the wall 17 of the container 5 and the portion 9 of the ram. This material will partly fill the gap as shown at 18 in FIG. 3.

Figure 2:
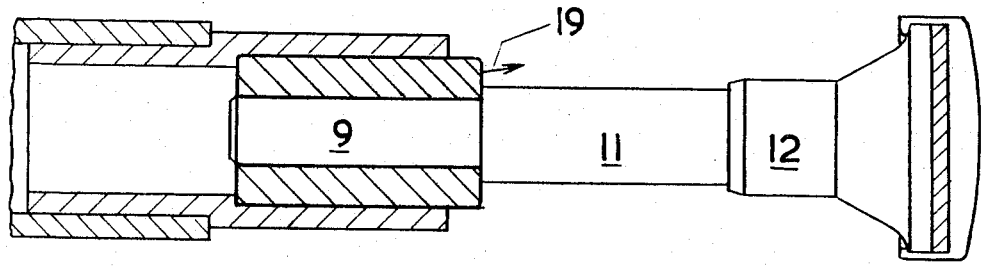
FIGS. 2 to 5 inclusive are cross-sectional views of the device in operation.
Figure 3:
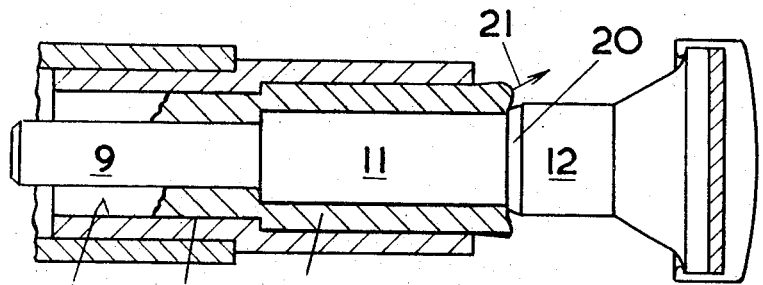
Figure 4:
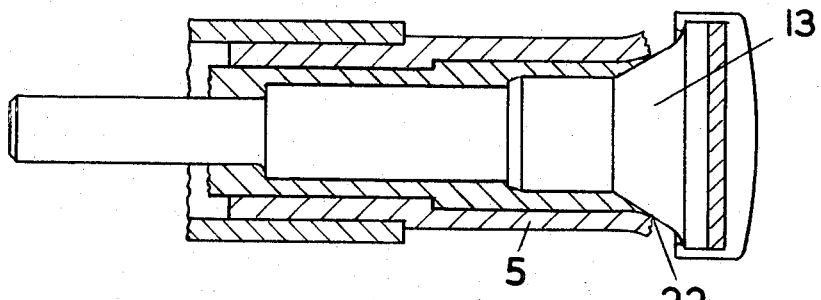

This extrusion will continue, although there may, of course, be some back extrusion in the direction of the arrow 19 (FIG. 2). It is thought, however, that the amount of back extrusion will be relatively small. Once the third portion 12 comes into contact with the slug 8, further extrusion will occur and more material will be forced into the gap between the wall 17 and the portion 9. The slightly conical leading edge 20 of the portion 12 enhances the start of this further stage of extrusion.

Figure 5:
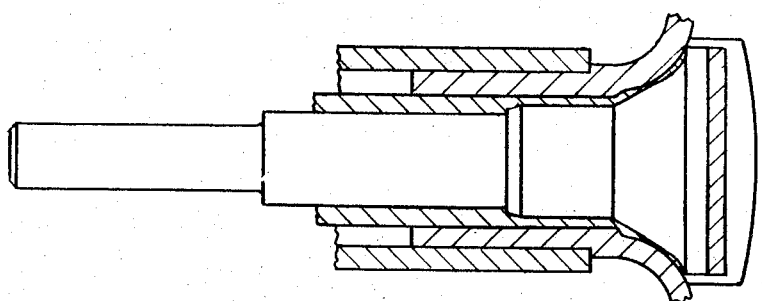

This further stage of extrusion, together with some slight back extrusion which may occur in the direction of the arrow 21, will proceed until the frusto-conical portion 13 of the head contacts the leading edge 22 of the container 5. This situation can be seen most clearly in FIG. 4 and once this position has been reached, further movement of the ram will result in further extrusion of the slug 8 and also of deformation of the container 5. The container will either crack and break up in some manner or will crumple, or will splay out plastically without cracking. If necesssary, a breaking knife edge can be incorporated into the frusto-conical portion 13 as shown dotted at 23 in FIG. 1 to start the break up of the container 5. Deformation of the container and further extrusion will continue to occur until the situation is reached as shown in FIG. 5 after which no further movement of the device can occur.

It can be seen that a cylindrical slug 8 is extruded sequentially several times so that the maximum amount of work can be done on it to absorb the maximum amount of energy in the distance available for movement of the device.

Figure 6:
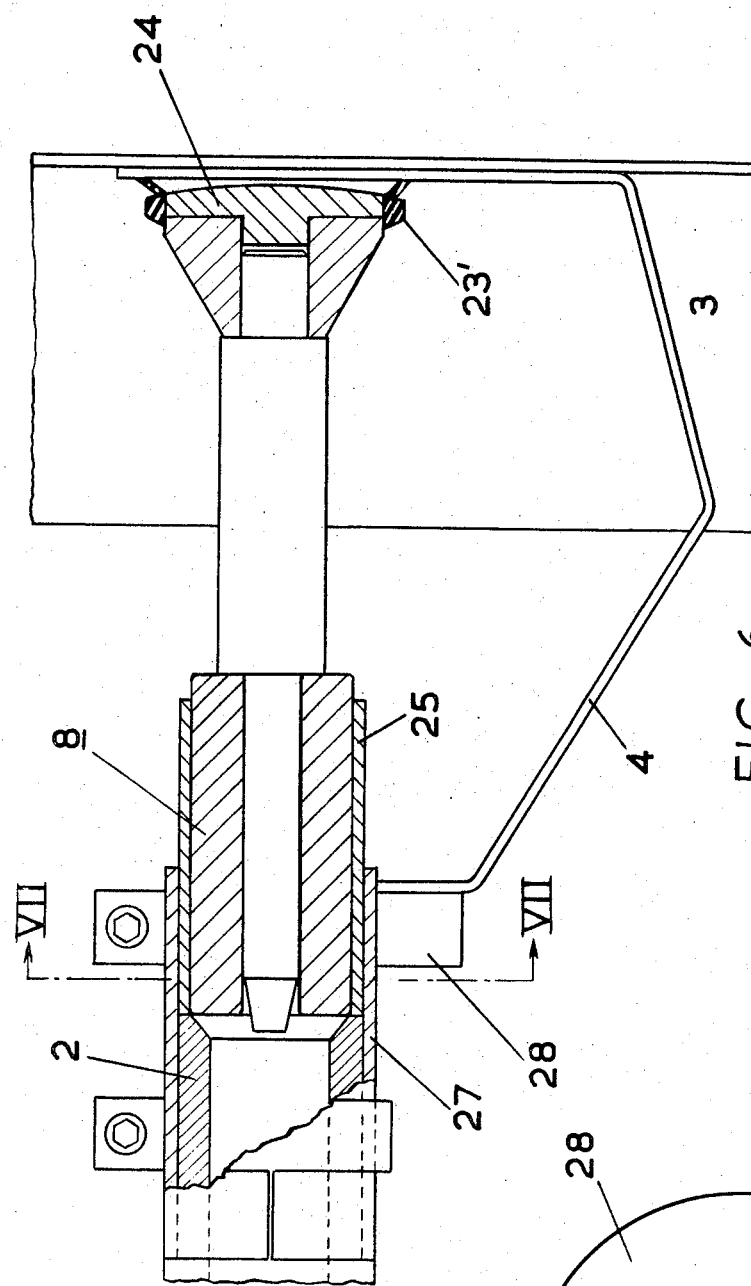
FIG. 6 is a part cross-sectional view of a second embodiment of the invention.
Figure 7:
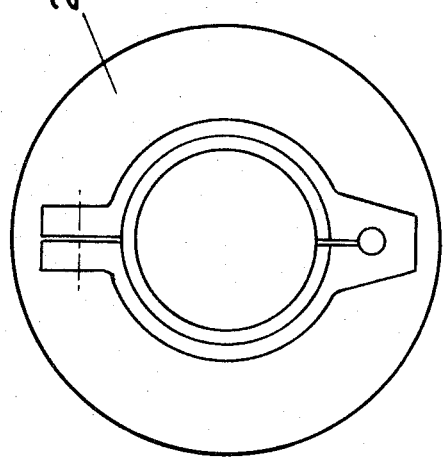
FIG. 7 is a part section along the line VII—VII of FIG. 6.
Figure 8:
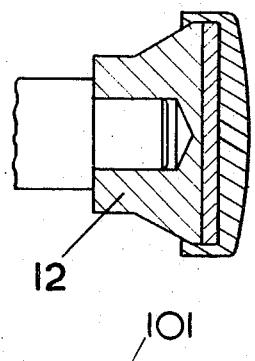
FIG. 8 is a cross-sectional view of an alternative form of head.

Alternative forms of the device are illustrated in FIGS. 6 to 8 where like portions of the device are given like reference numerals. It can be seen that the third portion 12 is omitted in the device of FIG. 6, although it is present in the portion shown in FIG. 8. The main difference between the devices in FIGS. 1 and 6 is the difference between the heads, the device of FIG. 6 incorporating an annular seal 23' and a solid polytetrafluoroethylene and a solid block 24, and the containers. The container 25 of the device of FIG. 6 is itself supported by a tube 27 which also helps support the spring 4 whereby the bumper 3 is secured to the horn 2 of the car. An annular clamp 28 is used to secure the spring 4 to the tube 27.

The head shown in FIG. 8 is similar to that shown in FIG. 1, except that it does not have the chamfered leading edge 20. With the device shown in FIG. 6, the slug 8 is only extruded effectively once rather than the twice as with the device of FIG. 1 and also to some extent with the device of FIG. 8. However, with the device of FIG. 8, the diameter of the head 12 is such that full extrusion in a forward direction of the slug 8 is necessary and no back extrusion can occur between the head 12 and the cylinder 25. It can be seen from both FIGS. 1 and 6 that the slug 8 protrudes outside the length of the cylinder 5. This is to reduce the inevitable load peak to one which occurs when the extrusion starts and before the steady state extruding phase occurs.

The use of the low friction head and low friction surface 15 is to accomodate "side swipes" which inevitably occur in a real-life situation. In the "ideal" situation of a direct head-on collision, the device is only subjected to end on loads. However, with "side swipes," the bumper is pushed sideways in addition to being moved backwards relative to the car and the low friction surface enables the device to ignore this lateral movement and only to take out the longitudinal movement of the bumper. This resistance to side swipes is very important and it is believed that the device of FIG. 1 will probably be more resistant than the device of FIG. 6.

Figure 9:
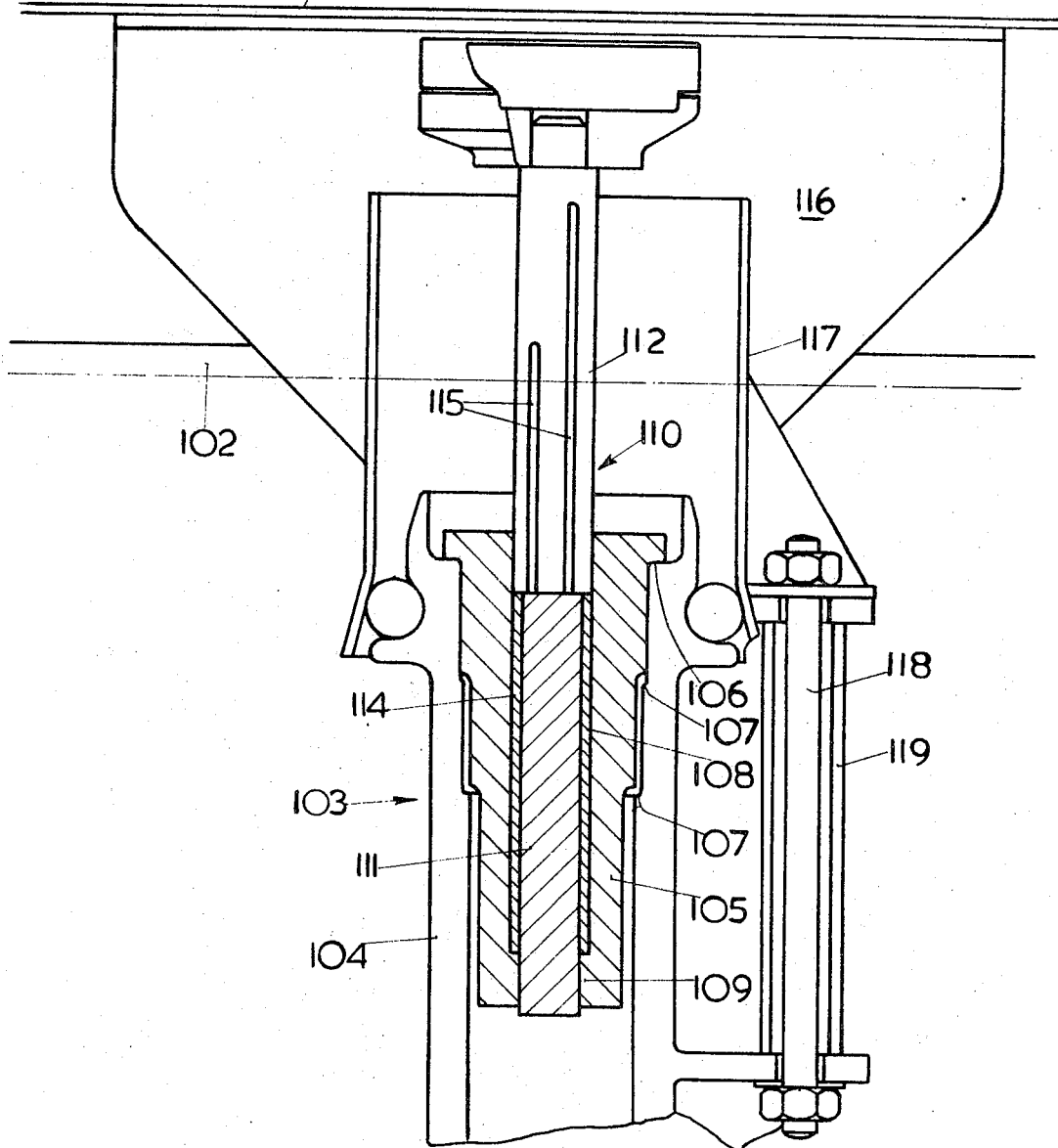
FIG. 9 is a cross-sectional view of a further embodiment of the invention.

Referring to the device of FIG. 9, a bumper 101 is attached to a vehicle body 102 by means of the device indicated generally at 103. The device includes an outer shell 104 in which rests a stepped cylindrical insert 105. The shell has a series of shelves 106, 107 and the insert rests against at least one of these. The bore 108 of the insert has a reduced diameter portion 109 at its lower end. Located in the bore 108 is a rod 110 which has a first constant diameter over a part of its length 111 and a second, greater, constant diameter over a second part of its length 112. The lower part of the rod 110 and the bore 108 define an annular chamber which contains a cylindrical slug of lead 114. The upper part of the rod is provided with a series of slots 115 which are shown as having a constant cross-section but a varying length, but which can have a constant length and a varying cross-section or a constant or varying length and cross-section. The shell 104 is securely attached to the vehicle body and the bumper is held in position by means of a plate 116 which is welded to a sheath 117. The sheath is bolted to the shell 104 by means of a bolt 118 mounted in a deformable cylinder 119.

In the event of an accident, and it envisaged that this device will be especially useful in low speed collisions, such as are encountered during parking, the bumper would be forced back down as shown in the drawing. This would deform the cylinder 119, and simultaneously force the rod 110 down through the insert 105, extruding the slug 114 through the orifices formed by the slots 115.

It will be appreciated that various modifications could be made to the device and to the system. For example, the slug material could be either a plastics material or lead or aluminum or any other suitable metal and the heads could be made larger than shown in the drawings if required. They need not necessarily be circular and could be rectangular or oval if required. Although the frusto-conical portion 13 has been shown to have a breaker edge 23, this could be dispensed with and alternative stress raisers used if required. Such things as saw cuts could be made in the container 5 or any other stress raiser could be used.

To tailor the device to give desired characteristics of the rate of energy removal, the physical properties of the slug can be modified, and in the embodiments including a container, the mode of deformation of the container can be altered.

The slug is shown as a single item. It can, however, be formed from a series of washers, the washers having different hardness and resistance to deformation. If two "washers" are used, one for example of polyethylene and the other of polypropylene, the harder polypropylene may be positioned on the outside adjacent the shoulder of the second portion 11 and the softer polyethylene washer being inside the two forming a composite slug. The effect of having the difference in hardness means that at the start of extrusion, they polyethylene slug is extruded in a forward direction whereas the harder polypropylene slug is very little extruded and very little back extrusion results as a result of this. Also, of course, as the extrusion of the polyethylene is completed and the harder polypropylene has to be extruded, the resistance to extrusion increases and thus the rate at which energy is absorbed also increases assuming the same speed of travel of the ram. The harder polypropylene washer also by cutting down the back extrusion, can alleviate problems which may arise if an annular portion of the back extrudate is caught outside the edge 22 and the head 13 (to the right of edge 22 when seen in FIG. 4).

The use of two or more such washers can offer a further ability to control the rate of energy removal so that the device may be tailored to any given situation. Additionally fillers may be used in what would otherwise be a single material slug to effect the hardness of the slug axially along its length. The fillers could be of any suitable material, either to soften or harden the slug as required. In a further form the slug could be formed by having an apertured frusto-conical slug of one material surrounded by a mating apertured slug to provide a slug in which the proportions of the two materials varied along its axial length. In such a case, the properties of the slug would be continuously variable along its axial length.

The mode of deformation of the container is a further variable which may be altered to tailor the device for a given situation. The container can be designed so as to rupture in the form of an opening petal device or alternatively it may be designed so as to deform plastically, being stretched circumferentially by the head as it passes into the container. Once a part of the container has been deformed, the main requirement is that it shall not obstruct the further passage of the ram into the device and shall allow the remaining parts of the container to be deformed to permit further engergy to be absorbed.

I claim:

1. An energy absorbing device for a vehicle, said device including
   a. a container,
   b. an extrudable slug located at least partially within said container,
   c. a ram for back extruding said slug,
   d. a conical head portion of said ram for spreading the extrudate of said extrudable slug, and
   e. a breaker knife edge operatively associated with said ram for splitting said extrudate, whereby movement of said ram relative to said slug results in back extrusion of said slug.

2. A device as recited in claim 1 wherein said slug is annular having a central passageway therethrough, and wherein said ram has a portion thereof extending through said central passageway of said slug, and wherein said ram has an enlarged portion thereof contactable with said slug.

3. A device as recited in claim 2 wherein said container is plastically deformable at a load greater than the load at which said slug is deformable.

4. A device as recited in claim 3 wherein said container is deformable by rupturing.

5. A device as recited in claim 3 wherein said container is deformable by stretching.

6. A device as recited in claim 3 wherein said container is rupturable and stretchable.

7. A vehicle including a bumper and a device operatively associated with said bumper, said device including
   a. a deformable container,
   b. an annular slug having a central passageway therethrough, said slug located at least partially within said container,
   c. a ram for extruding said slug, said ram having a portion thereof located within said central passageway of said slug and having an enlarged portion thereof contactable with said slug, whereby movement of said bumper relative to said vehicle results in extrusion of said slug and deformation of said container under load.

8. A vehicle as recited in claim 7 wherein said container is plastically deformable at a load greater than the load at which said slug is extruded.

9. A vehicle as recited in claim 8 wherein said container is deformable by rupturing.

10. A vehicle as recited in claim 8 wherein said container is deformable by stretching.

11. A vehicle as recited in claim 8 wherein said container is deformable by rupturing and stretching.

* * * * *